(12) United States Patent
Vanstone

(10) Patent No.: US 7,216,237 B2
(45) Date of Patent: May 8, 2007

(54) SYSTEM AND METHOD FOR TRUSTED COMMUNICATION

(75) Inventor: Scott A. Vanstone, Campbellville (CA)

(73) Assignee: Certicom Corp., Mississauga (CA)

(*) Notice: Subject to any disclaimer, the term of this patent is extended or adjusted under 35 U.S.C. 154(b) by 886 days.

(21) Appl. No.: 09/905,113

(22) Filed: Jul. 16, 2001

(65) Prior Publication Data

US 2003/0014632 A1    Jan. 16, 2003

(51) Int. Cl.
*H04L 9/00* (2006.01)

(52) U.S. Cl. ............... 713/184; 713/185; 713/171; 705/72; 705/67; 705/65; 726/20; 726/9

(58) Field of Classification Search ........... 380/247; 713/171, 185, 184; 705/65–67, 72, 75, 76, 705/41, 44; 726/9, 20
See application file for complete search history.

(56) References Cited

U.S. PATENT DOCUMENTS

| | | | | |
|---|---|---|---|---|
| 5,557,518 A | * | 9/1996 | Rosen | 705/69 |
| 5,778,071 A | | 7/1998 | Caputo et al. | |
| 5,778,072 A | * | 7/1998 | Samar | 380/30 |
| 5,917,913 A | * | 6/1999 | Wang | 705/67 |
| 6,142,369 A | | 11/2000 | Jonstromer | |

FOREIGN PATENT DOCUMENTS

| | | |
|---|---|---|
| CA | 2308386 A1 | 5/1999 |
| DE | 19747603 A1 | 5/1999 |
| DE | 299 22 971 U1 | 4/2000 |
| WO | WO 96/32700 | 10/1996 |
| WO | WO 00/54457 | 9/2000 |
| WO | WO 02/28005 A2 | 4/2002 |

OTHER PUBLICATIONS

D.W. Davies, W.L. Price, Security for Computer Networks, pp. 331-336.

* cited by examiner

*Primary Examiner*—Emmanuel L. Moise
*Assistant Examiner*—Paul Callahan
(74) *Attorney, Agent, or Firm*—Blake, Cassels & Graydon LLP; Brett J. Slaney; John R. S. Orange

(57) ABSTRACT

A method of establishing a trusted path of data and a method of verifying the integrity of data presented for signing to a user of the personalized device in a public-key cryptographic scheme. The method comprises establishing a trusted path between the user and secure module residing on the personalized device. The secure module holds the user's private key, displays information about the data message directly to the user, and generates the signature only when instructed to do so. The decision whether or not to sign the data message is determined by the user.

11 Claims, 3 Drawing Sheets

SYSTEM AND METHOD FOR TRUSTED COMMUNICATION

FIELD OF THE INVENTION

This invention relates to a method of establishing trusted communication paths between correspondents in a public-key cryptographic scheme. More particularly, it relates to verification of data integrity before computation of a signature.

BACKGROUND OF THE INVENTION

Electronic commerce is hampered by privacy and security concerns, as there is no reliable way to ensure that the sender of an electronic transmission is in fact who they purport to be. Due to the non-physical nature of the medium, traditional methods of is physically marking the media with a seal or signature, for various business and legal purposes, are not practical. Rather, some mark must be coded into the information itself in order to identify the source and authenticate the contents.

In business, whether online or face-to-face, the client and the merchant must provide identification, authentication and authorization. Identification is the process that enables recognition of a user described to an automated data processing system and authentication is the act of verifying the claimed identity of an individual, station or originator, and finally authorization is the granting of the right of access to a user, program, or process.

A solution to the problems of identification, authentication, confidentiality, authentication, integrity and non-repudiation in information systems lies in the field of cryptography. For confidentiality, encryption is used to scramble information sent between users so that eavesdroppers cannot understand the data's content. Authentication usually employs digital signatures to identify the author of a message such that the recipient of the message can verify the identity of the person who signed the message. Digital signatures can be used in conjunction with passwords or as an alternative to them.

Message integrity is determined by methods that verify that a message has not been modified, such methods typically employ message digest codes. Non-repudiation describes the creation of cryptographic receipts so that an author of a message cannot falsely deny sending a message. Thus the Internet reveals the full complexity of trust relationships among people, computers, and organizations.

As mentioned above, one method of authentication involves digital signatures. Digital signatures use public-key cryptographic techniques employing two related keys, a public key and a private key. In public-key cryptography, the public key is made available to anyone who wants to correspond with the owner of the corresponding private key. The public key can be used to verify a message signed with the private key or encrypt messages that can only be decrypted using the private key. The secrecy of messages encrypted this way, and the authenticity of the messages signed this way relies on the security of the private key. Thus, the private key is kept secret by the owner in order to protect the key against unauthorized use.

Traditionally smart cards have been used as signing tokens for authenticating a user, smartcards are an alternative name for a microprocessor card, in that it refers to a chip card that is 'smart'. The expression 'Smart Card' is used to refer to all types of chip cards, however SMARTCARD® is a registered trademark of Groupmark. Smart cards place digital certificates, cryptographic keys and other information on a PIN-protected token carried by the end-user, which is more secure than storing it on a computer device which may be vulnerable to unauthorized access. All the cryptographic algorithms involving the private key such as digital signatures and key exchanges are performed on the card. By signing transactions in such an environment, users are assured a modicum of integrity and privacy of the data exchanged between each other. The private key need not be revealed outside of the token.

One of the disadvantages of smartcards is that the owner is not protected from abuse of the smart card. For example, because of the lack of a user interface, such as a display screen, the owner may not be sure about the contents of the actual message being signed with the smartcard. Another drawback of smartcards is that any entity or person in possession of the smartcard and the PIN, who may not be the rightful owner or which may be a malicious application, in effect has knowledge of the private key.

Another solution is the implementation of a personalized device, such as a wireless application protocol (WAP) capable mobile phone or wireless personal digital assistant (PDA), as a signing token. Such a personalized device can store private key and sign transactions on behalf of its owner. In such a situation, the holder of the personalized device is assumed to be its rightful owner or authorized representative as determined by an appropriate access-control mechanism. The data message may be generated on an external device, such as an external computer, and then presented to the personalized device for signing. Alternatively, the data message can be generated completely on the personalized device. However, there exists substantial risk for fraud in both of these situations.

With reference to the first situation in which a data message is prepared on a personal computer, or similar, and then conveyed to the personalized device for signing and transmission, integrity of the message may be comprised. In this example, the owner of the personalized device may wish to employ the larger viewing area or the computing power available on a personal computer to browse and assemble the transaction. Once the data message has been assembled on the personal computer, the data is transmitted to the personalized device for signing. The personalized device calculates a signature, and the signed data message is transmitted via the personalized device. The personalized device thus acts both as a signing token and as a transmitting device.

In this situation, it is assumed that the external computer can be trusted and that this computer does not contain malicious software or has been programmed by unscrupulous individuals to alter the content of the message. Should the data presented for signing be different from that displayed, then the owner of the private key would then sign fraudulent or financially harmful transactions.

With reference to the second situation, an example of potential fraud will now be described. Suppose that the personalized device operating system becomes corrupted through any number of ways, such as, by unintentionally installed software containing malicious code, script embedded in messages, or by compromise of the personalized device operating system via security holes. This malicious code could then alter the contents of transactions, as described above.

Indeed, there is greater potential for fraud as transactions could be created, signed, and transmitted without the knowledge of the owner. The non-repudiation of such fraudulently obtained signed transactions would be difficult to contest as prima facie the personalized device's owner appears to have sanctioned the data message by appending a valid signature.

Accordingly, it is an object of the present invention to mitigate at least one of the above disadvantages.

SUMMARY OF THE INVENTION

In accordance with one of its aspects, the invention provides a method of establishing a trusted path for data between correspondents in a public-key cryptographic scheme, one of the correspondents being a personalized device. The method also provides a means of verifying the integrity of data presented for signing to the user of the personalized device. In one aspect, the personalized device may be a mobile phone, equipped with an operating system, input/output devices and is provided with a secure module independent of the operating system.

The secure module is arranged to accept no instructions from the operating system on the personalized device. Accordingly., there is a diminished possibility of compromise of the data prior to signing.

In order to mitigate the drawbacks of prior art devices, the method of establishing a trusted communication path for data between authenticating device and its user comprises the steps of: logically isolating the secure module from the main processor of the personalized device; storing the private key within the secure module; providing trusted paths between the user and the secure module of the personalized device, such trusted paths may follow the criteria set in FIPS 140-2, the United States Government standard that describes the security requirements for cryptographic hardware and software modules. Coupled to the secure module is a device display, which provides textual and graphical displays that prompt a user for information input. A trusted button facilitates the input of information. The secure display are wholly under the control of the secure module and coupled thereto by secure paths, and the trusted button is in direct communication with the secure module via secure path. Trusted paths reduce the chances of unauthorized and undetected modification of the secure module, including the unauthorized modification, substitution, insertion, and deletion of keys and other critical security parameters.

Accordingly, possible fraudulent use of the private key is diminished as the user signs only valid and legitimate data.

DESCRIPTION OF THE DRAWINGS

These and other features of the preferred embodiments of the invention will become more apparent in the following detailed description in which reference is made to the appended drawings wherein.

DETAILED DESCRIPTION OF THE INVENTION

Figure 1:
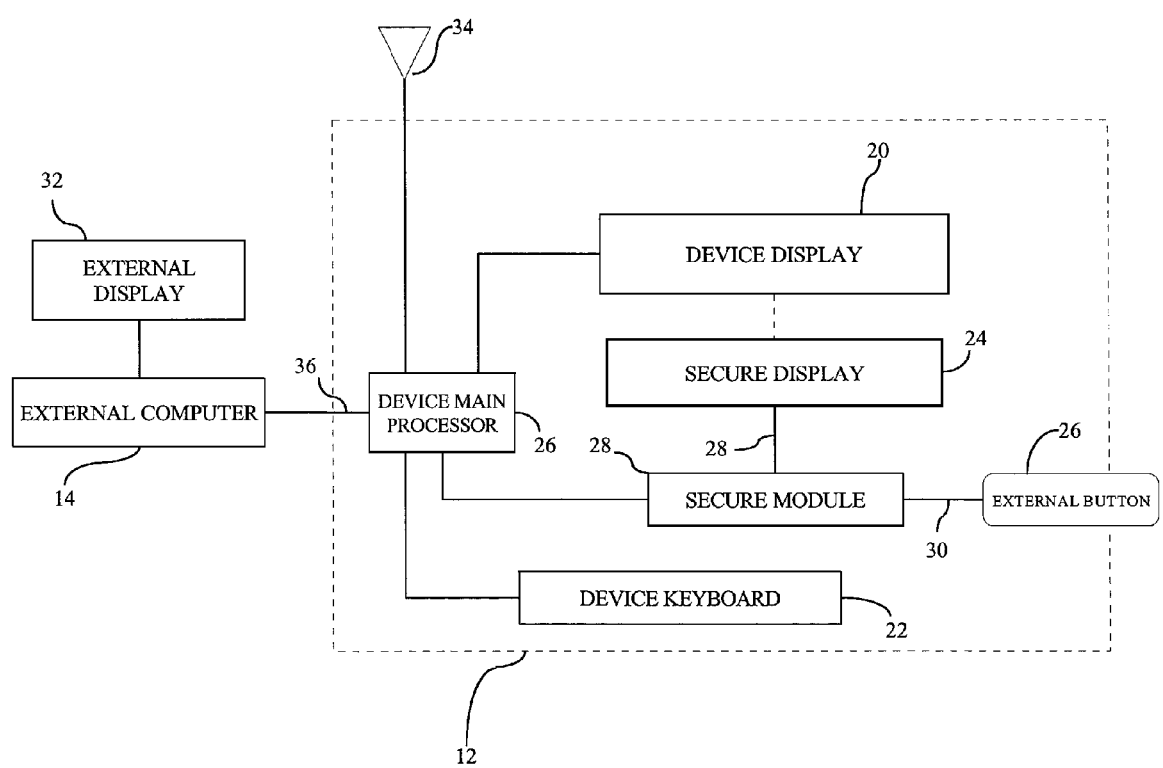
FIG. 1 is a schematic diagram of two correspondents in communication with each other, in which the correspondents are an external computer and a personalized device in ghost outline.

Reference is first made to FIG. 1, which shows a system 10 for verifying the integrity of a data message including a first correspondent 12 and a second correspondent 14 are in communication with each other, in a preferred embodiment. The first correspondent 12 is designated as a personalized device 12 and the second correspondent 14 is designated as an external computer 14. Preferably, the personalized device 12 is a wireless application protocol (WAP) enabled mobile phone or a wireless personal digital assistant (PDA) such as a Palm Pilot® or a Handspring Visor®. In this embodiment the personalized device 12 is a mobile phone controlled by the device main processor 16 including a secure module 18.

The secure module 18 is adapted to operate independently of the device main processor 16, so that the internal state of the secure module 18 can not be readily reverse engineered and/or that its interactions with the underlying hardware are not maliciously intercepted and reinterpreted. The secure module 18 is programmable through appropriate toolkits to accept only certain types of instructions from underlying hardware, such as the device main processor 16. The secure module 18 can be adapted to be removably coupled to the personalized device.

Coupled to the device main processor 16 is a device display 20, which provides textual and graphical displays that prompt a user for information input. The input of information is facilitated by a keyboard 22 coupled to the device main processor 16. Similarly, the secure module 18 is in communication with a secure display 24, a secure part of display 24, and a secure input device, preferably a trusted button 26. The secure display 24 is wholly under the control of the secure module 18 and coupled thereto by secure path 28, and the trusted button 26 is in direct communication with the secure module 18 via secure path 30. Thus, the secure paths 28 and 30 are logically isolated and distinct from any other paths. The secure module 18, the secure I/O devices 24 and 26, and the secure paths 28 and 30 form trusted paths between said secure module 18 and a user of the personalized device 12.

The external computer 14 may be a general computer, a personal computer or a workstation and includes an external display 32. The data message for authentication is transmitted from the external computer via a communication path to the personalized device 12 and received by the message transceiver 34. The data message for authentication by the personalized device 12 is communicated from the external computer 14 via communication path 36 or through a wireless air interface to an antenna coupled to the transceiver 34. Accordingly, the personalized device 12 preferably includes a serial interface, a universal serial bus (USB) interface, an "over the air" interface based on the IEEE 802.11 specification or a BLUETOOTH® interface. Thus, the personalized device 12 can receive data, and can be used to sign a data message generated on the external computer 14.

In operation, the external computer 14 assembles the data comprising the portion of the data message to be signed, preferably displaying the appropriate data message on the external display 32, and conveying the data to the personalized device 12 via the path 36. The device main processor 16 conveys the data to the secure module 18, optionally displaying the same data on the display 20. The secure module 18 displays the data message, or a portion of the message, on the secure display 24 in an appropriate format. In order to verify the integrity of the data, the user compares the data message on the external display 32 and the data message, or portion of it, with the data message on the secure display 24. If there is a match between the two data messages, the user instructs the secure module 18, specifically the signature generator to generate a signature by actuating the trusted button 26. However, if the data messages differ this indicates compromise of the data message conveyed to the secure module 18 and the user can elect not to generate a signature.

The secure module 18 may be equipped with a verification manager to identify the user using the system 10. The verification manager determines the access rights and privileges through passwords or biometrics. For example, the external trusted button 26 may also be used to enter a PIN should access control to the secure module 18 be required. For example, in one implementation, the secure module 18 will only generate a signature within a predetermined time period after displaying the data message. Therefore, the external button 26 has to be actuated within the predetermined time period. In order to complete the transaction, the generated signature is conveyed to the device main processor 16 for transmission via the message transceiver 34. In the event that the external computer 14 attempts to defraud the user of the personalized device 12 by composing a false message or other harmful transaction, the data message output by the secure module 18 will not match with the data message displayed on the external display 32 and the data message will not be authenticated by the user, via the trusted button 26.

Figure 2:
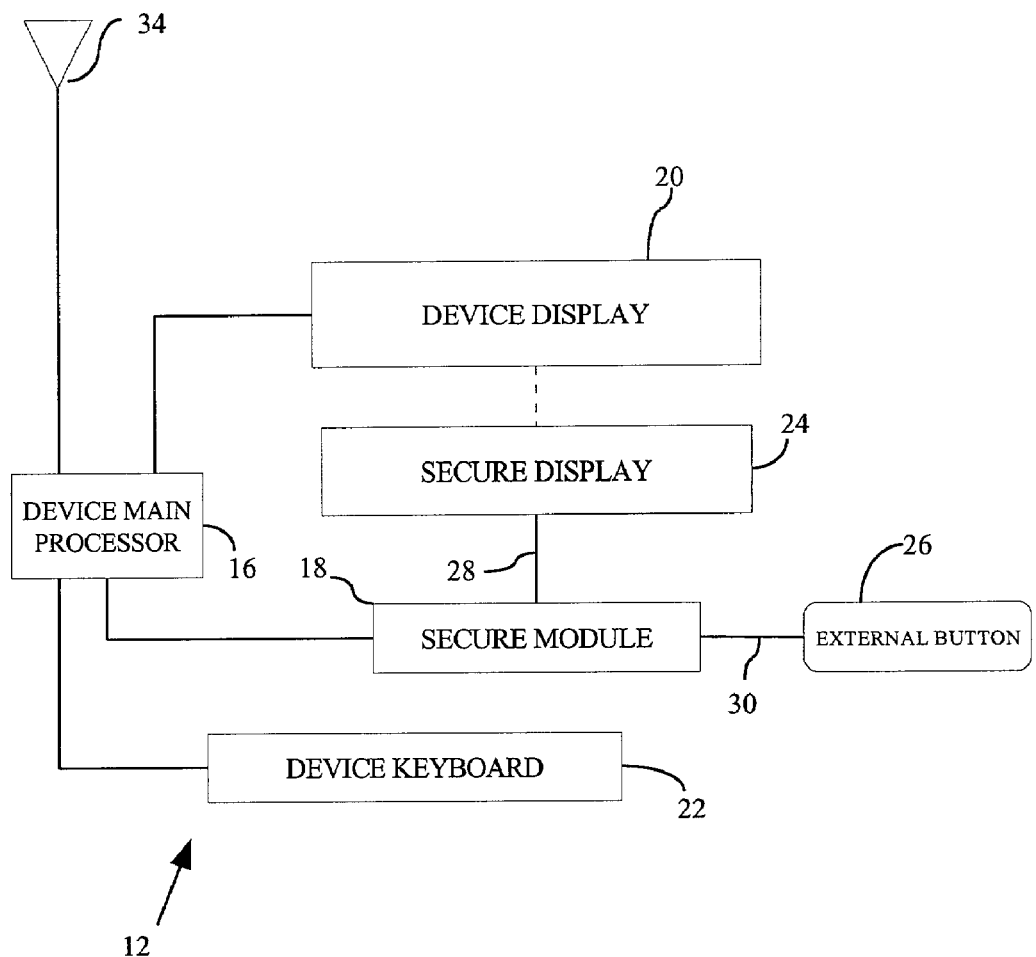
FIG. 2 is a schematic diagram of the stand-alone personalized device of FIG. 1, for use in a PKI scheme.

In another embodiment, the personalized device 12 is a mobile phone and the data message is composed on the personalized device 12, as shown in FIG. 2. The portion of the data to be signed is displayed on the device display 20. The secure module 18, along with its secure display 24 and trusted button 26, behaves in the same manner as indicated in the preferred embodiment. Upon instruction by the user via the trusted button 26, a signature is generated and the signed data message is transmitted via the transceiver 34.

Figure 3:
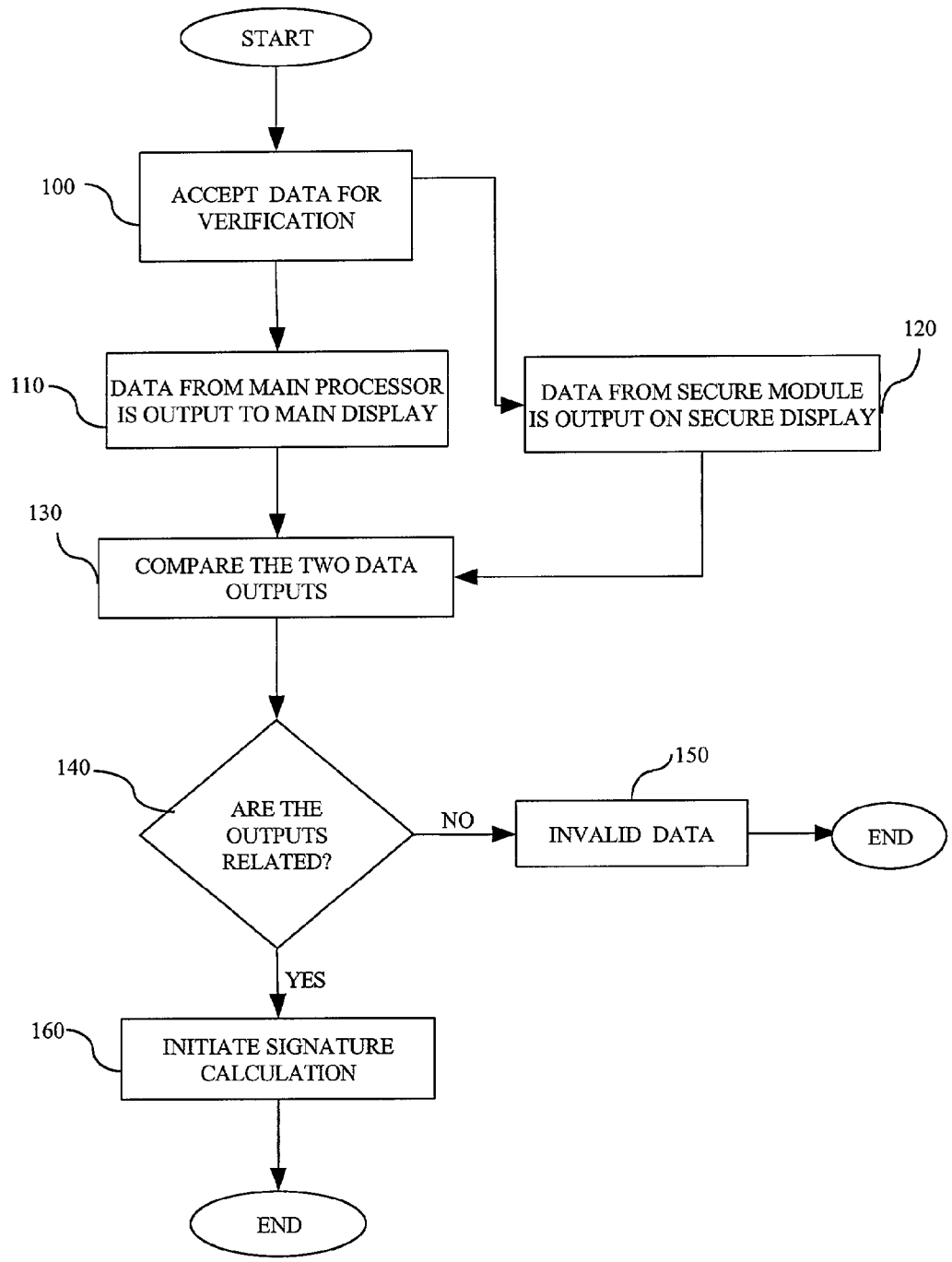
FIG. 3 is a flow chart outlining the steps for authenticating a received message for generation of a signature.

The method for the verifying the integrity of the data message to determine whether or not to create a signature will now be described, with reference to FIG. 3, which shows a flowchart illustrating the steps employed:

Step 100: The secure module 18 accepts data from device main processor 16, the data comprises the portion of the data message to be signed and may have been assembled on the personalized device 12 or assembled externally by a external computer 14 and then conveyed to the personalized device 12;

Step 110: The secure module 18 displays the data message on the secure display 24, and awaits instruction;

Step 120: The data message from the main processor 16 is displayed on the device display 20, and or the external display 32;

Step 130: The user compares the data message on the device display 20 to the data message on the secure display 24;

Step 140: A decision is made as to whether there is any correlation between the two data messages, that is, whether the data messages, or portions of the data messages, are logically related to one another;

Step 150: If the data message is considered unacceptable, the user instructs the secure module 18 via the trusted instruction path 30 not to calculate a signature; or else Step 160: if the user determines the data message on the secure display 24 to be acceptable, the signature generator in the secure module 18 is instructed via the trusted instruction path 30 by actuating the trusted button 26 to calculate the signature. A further level of assurance may be provided by using the trusted instruction path 30 to enter a PIN and requiring that the secure module 18 does not issue any signatures in the absence of the correct PIN.

In yet another embodiment, the secure module is software based. In this embodiment, the secure module 18 is a software application running on the device 21 that outputs the data message to a secure portion of the device display 20, and accepts instructions as input from the device keyboard 22.

The above-described embodiments of the invention are intended to be examples of the present invention and alterations and modifications may be effected thereto, by those of skill in the art, without departing from the scope of the invention which is defined solely by the claims appended hereto.

The embodiments of the invention in which an exclusive property or privilege is claimed are defined as follows:

1. A method of verifying data integrity between at least two correspondents in a cryptographic scheme, at least one of said at least two correspondents having a main processor and a secure module, said secure module being independently operative of said main processor, said method comprising the steps of:
   assembling data on at least one of said at least two correspondents;
   displaying said data under control of said main processor to produce a first output;
   forwarding said data to said secure module and displaying said data from said secure module to produce a second output to permit comparison of said first output and said second output; and
   instructing said secure module to generate a signature on said data upon a favorable comparison of said first output and said second output;
   whereby said favorable comparison indicates data integrity such that said at least one of said correspondents signs said data.

2. The method of claim 1, wherein said at least one of said at least two correspondents is a personalized device.

3. The method of claim 2, wherein said personalized device is a mobile phone.

4. The method of claim 2, wherein said personalized device is a personal digital assistant.

5. The method of claim 1, wherein said favorable comparison is characterized in that said first output and said second output are logically related to one another.

6. The method of claim 5, wherein said logical relationship is such that said first output and said second output are identical.

7. The method of claim 1, wherein said step of displaying said data message includes displaying a portion of said data message.

8. The method of claim 7, wherein said favorable comparison is characterized in that a portion of said first output and a portion of said second output are logically related to one another.

9. The method of claim 8, wherein said logical relationship is such that said portion of said first output is identical to said portion of said second output.

10. A method of establishing a trusted communication path for data between a personalized device and a user of said device in a cryptographic scheme, said device having a main processor and a secure module independently operative of said main processor, said method comprising the steps of:
    providing an interface between said device and said user, said interface having an input device and an output device for providing a means for interaction between said user and said device, said input device and said output device controllable by said main processor;
    providing a trusted communication path between said secure module and a secure input device and a secure output device coupled thereto, said trusted path logically isolated from any other communication path;

assembling data at said input device and said secure module and forwarding said data to said secure output device over said trusted communication path; and displaying said data on said output device and said secure output device, to permit comparison of said data displayed on said output device and said secure output device;

whereby said user of said personalized device can determine said integrity of said data based on said comparison.

11. The method of claim 10, wherein said user actuates said secure input device based only on said output of said secure output device.

* * * * *